(12) United States Patent
Carlsson

(10) Patent No.: US 12,360,594 B1
(45) Date of Patent: Jul. 15, 2025

(54) ON-THE-FLY CORRECTION OF CALIBRATION ERRORS BASED ON USER EXPERIENCE

(71) Applicant: Distance Technologies Oy, Helsinki (FI)

(72) Inventor: Thomas Carlsson, Vantaa (FI)

(73) Assignee: Distance Technologies Oy, Helsinki (FI)

(*) Notice: Subject to any disclaimer, the term of this patent is extended or adjusted under 35 U.S.C. 154(b) by 0 days.

(21) Appl. No.: 18/780,945

(22) Filed: Jul. 23, 2024

Related U.S. Application Data

(63) Continuation-in-part of application No. 18/630,154, filed on Apr. 9, 2024.

(51) Int. Cl.
 G06F 3/01 (2006.01)
 G02B 27/01 (2006.01)

(52) U.S. Cl.
 CPC ......... G06F 3/013 (2013.01); G02B 27/0101 (2013.01); G02B 27/0179 (2013.01); G06F 3/012 (2013.01); G02B 2027/0134 (2013.01); G02B 2027/014 (2013.01); G02B 2027/0187 (2013.01)

(58) Field of Classification Search
 CPC ......... G06F 3/012; G06F 3/013; G09G 3/001; G09G 2340/0435; G09G 2354/00; G09G 2380/10; H04N 23/20; G02B 27/0101; G02B 2027/0187
 See application file for complete search history.

(56) References Cited

U.S. PATENT DOCUMENTS

| | | | |
|---|---|---|---|
| 9,459,692 B1* | 10/2016 | Li | G02B 27/017 |
| 2014/0375540 A1* | 12/2014 | Ackerman | G06F 3/16 |
| | | | 345/156 |
| 2018/0196507 A1* | 7/2018 | Kim | H04N 13/106 |
| 2023/0065018 A1* | 3/2023 | Dorn | G06F 3/011 |
| 2024/0112428 A1* | 4/2024 | Levi | G06T 19/20 |

* cited by examiner

*Primary Examiner* — Dmitriy Bolotin
(74) *Attorney, Agent, or Firm* — ZIEGLER IP LAW GROUP

(57) ABSTRACT

A light field image is generated, based on a relative location of a first eye and of a second eye of a user with respect to an optical combiner. The light field image is displayed to produce a synthetic light field presenting virtual content, wherein the optical combiner reflects a first part and a second part of the synthetic light field towards first eye and second eye, respectively, whilst optically combining the first and second parts with a real-world light field. These steps are repeated for a given time period, during which it is detected when the user has made a head movement, whilst fixating on a portion of the virtual content. Upon detection, a current relative location is corrected, a current light field image is generated and displayed to produce a current synthetic light field.

18 Claims, 5 Drawing Sheets

ON-THE-FLY CORRECTION OF CALIBRATION ERRORS BASED ON USER EXPERIENCE

CROSS-REFERENCE TO RELATED APPLICATIONS

This application is a continuation-in-part of U.S. patent application Ser. No. 18/630,154, entitled "TRACKING ACCURACY WITH HEAD POSE PREDICTION" as filed on Apr. 9, 2024, the disclosure of which is incorporated herein by reference in its entirety.

TECHNICAL FIELD

The present disclosure relates to systems incorporating on-the-fly correction of calibration errors based on user experiences. The present disclosure also relates to methods incorporating on-the-fly correction of calibration errors based on user experiences.

BACKGROUND

Head-up display (HUD) technology has emerged as a significant advancement across various domains (for example, automotive sectors, aviation sectors, military sectors, and the like) for presenting visual information to users without diverting their attention from their primary tasks, for example, such as driving a vehicle. An HUD-based rendering necessitates precise calibration of critical subsystems, for example, such as a head-tracking system, an eye-tracking system, an optical combiner, and the like. Various projection methods demand differing levels of accuracy, but an overall visual quality is invariably determined by the weakest link in a complex pipeline which includes such critical subsystems. Ensuring each of these subsystems is accurately calibrated, is essential for maintaining an integrity of visual output.

Despite advances in the HUD technology, achieving high visual quality remains challenging due to a compounding effect of even minor calibration errors. These calibration errors can originate from any subsystem in a rendering pipeline, leading to degraded visual performance. Additionally, calibration issues can be both localised and temporary, often exacerbated by factors such as a thermal drift. These inaccuracies not only compromise a visual experience of a user, but also hinder a reliability and robustness of the HUD-based rendering, highlighting a need for improved calibration techniques and error mitigation strategies.

Therefore, in light of the foregoing discussion, there exists a need to overcome the aforementioned drawbacks.

SUMMARY

The present disclosure seeks to provide a system and a method which facilitate real time or near-real time displaying of a current light field image that is generated based on a corrected relative position of a first eye and a second eye of a given user, when the given user has made a head movement. The aim of the present disclosure is achieved by a system and a method which incorporate on-the-fly correction of calibration errors based on user experiences, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 3A illustrates an exemplary scenario of presenting virtual content to a given user before the given user has made a head movement, while

FIG. 5A illustrates an exemplary linear regression employed for re-calibrating tracking means, while

DETAILED DESCRIPTION OF EMBODIMENTS

Figure 1:
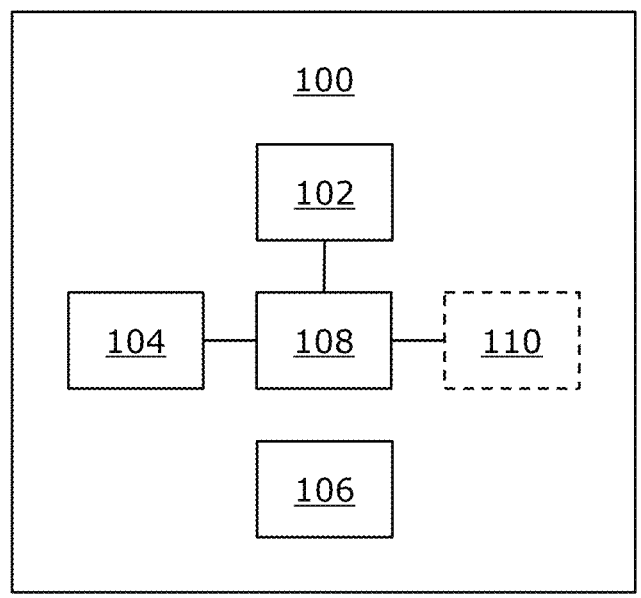
FIG. 1 illustrates a block diagram of an architecture of a system for on-the-fly correction of calibration errors based on user experience, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:
  tracking means;
  a light field display unit;
  an optical combiner arranged on an optical path of the light field display unit and on an optical path of a real-world light field of a real-world environment; and
  at least one processor configured to:
    determine a relative location of a first eye and of a second eye of a given user with respect to the optical combiner, by utilising the tracking means;

generate a light field image, based on the relative location of the first eye and of the second eye of the given user with respect to the optical combiner;

display the light field image via the light field display unit to produce a synthetic light field presenting virtual content, wherein the optical combiner is employed to reflect a first part and a second part of the synthetic light field towards the first eye and the second eye of the given user, respectively, whilst optically combining the first part and the second part of the synthetic light field with the real-world light field;

repeat the steps of determining, generating and displaying for a given time period;

during the given time period, detect, by utilising the tracking means, when the given user has made a head movement, whilst fixating on a portion of the virtual content; and when it is detected that the given user has made a head movement, whilst fixating on a portion of the virtual content, correct a current relative location of the first eye and of the second eye with respect to the optical combiner, based on a direction and a magnitude of the head movement;

generate a current light field image, based on the corrected current relative location of the first eye and of the second eye; and display the current light field image via the light field display unit to produce a current synthetic light field presenting the virtual content.

In a second aspect, an embodiment of the present disclosure provides a method comprising:

utilising tracking means to determine a relative location of a first eye and of a second eye of a given user with respect to an optical combiner, wherein the optical combiner is arranged on an optical path of a light field display unit and on an optical path of a real-world light field of a real-world environment;

generating a light field image, based on the relative location of the first eye and of the second eye of the given user with respect to the optical combiner;

displaying the light field image via the light field display unit for producing a synthetic light field presenting virtual content, wherein the optical combiner is employed for reflecting a first part and a second part of the synthetic light field towards the first eye and the second eye of the given user, respectively, whilst optically combining the first part and the second part of the synthetic light field with the real-world light field;

repeating the steps of determining, generating and displaying for a given time period;

during the given time period, detecting, by utilising the tracking means, when the given user has made a head movement, whilst fixating on a portion of the virtual content; and when it is detected that the given user has made a head movement, whilst fixating on a portion of the virtual content, correcting a current relative location of the first eye and of the second eye with respect to the optical combiner, based on a direction and a magnitude of the head movement;

generating a current light field image, based on the corrected current relative location of the first eye and of the second eye; and displaying the current light field image via the light field display unit for producing a current synthetic light field presenting the virtual content.

The present disclosure provides the aforementioned system and the aforementioned method which facilitate real time or near-real time displaying of the current light field image that is generated based on the corrected relative position of the first eye and the second eye of the given user, when the given user has made the head movement. Herein, in scenarios when the portion of the virtual content that is presented to the given user appears to be blurred (namely, out-of-focus) to the first eye and the second eye of the given user from a perspective of a current location of the head of the given user, the given user typically tries to adjust a location of the head (by moving the head from the current location to a new location) with respect to an optical combiner, whilst maintaining (namely, fixating) his/her gaze on the portion of the virtual content, in order to clearly view the portion of the virtual content from a perspective of the new location of the head. In such a case, according on the direction and the magnitude of the head movement of the user, the current relative location of the first eye and of the second eye is corrected with respect to the optical combiner. Upon correction, the current light field image is accurately and realistically generated for producing the current synthetic light field presenting the virtual content. Beneficially, in this way, the portion of the virtual content would be clearly visible (namely, appears to be in-focus) to the left eye and the right eye of the given user, as presented via respective parts of the current synthetic light field. This enhances an overall viewing experience of the given user, for example, in terms of realism and immersiveness. Thus, in this way, the system and the method are susceptible for performing dynamic, on-the-fly micro-corrections of small imperfections in the relative position of the first eye and the second eye. By leveraging a responsive natural user experience (UX) (namely, the head movement made by the user), the system and the method enable in taking advantage of a human tendency to instinctively adjust the head in response to visuals (namely, the virtual content) perceived as blurry, thereby enhancing a clarity and an overall visual quality of the presented virtual content. The system and the method are simple, robust, fast, reliable, support real-time on-the-fly correction of calibration errors based on user experiences, and can be implemented with ease.

Notably, the at least one processor controls an overall operation of the system. The at least one processor is communicably coupled to at least the tracking means and the light field display unit. In some implementations, the at least one processor is implemented as a processor of the light field display unit. In other implementations, the at least one processor is implemented as a processor of a computing device. Examples of the computing device include, but are not limited to, a laptop, a tablet, a phablet, and a smartphone. In yet other implementations, the at least one processor is implemented as a cloud server (namely, a remote server) that provides a cloud computing service.

Throughout the present disclosure, the term "tracking means" refers to specialised equipment for detecting and/or following at least a location of a given eye and of a head of the given user. The given eye encompasses at least one of: the first eye, the second eye. The first eye could be one of a left eye and a right eye of the given user, whereas the second eye could be another of the left eye and the right eye. Optionally, the tracking means is implemented as at least one tracking camera. Optionally, the at least one tracking camera comprises at least one of: at least one visible-light camera, at least one IR camera. Examples of a given visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Optionally, the at least one tracking camera further comprises at least one depth camera, in addition to the at least one of: the at least one visible-light camera, the at least one IR camera. Examples of the at least one depth camera include, but are not limited to, a Time-of-Flight (ToF) camera, a light detection and ranging (LIDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (for example, such as the at least one visible-light camera, the at least one IR camera and the at least one depth camera) may be utilised in the tracking means. When different types of images captured by the various different types of cameras are utilised, at least the location of the given eye and of the head of the given user can be determined accurately for tracking purposes, as results obtained from one type of image can be used to refine results obtained from another type of image. The different types of images may be at least one of: visible-light images, IR images, depth images. The tracking means could also be utilised to track an orientation of the given eye and/or of the head of the given user, in addition to the location of the given eye and of the head of given user.

Optionally, when utilising the tracking means, the at least one processor is configured to process tracking data collected by the tracking means, to determine a location and an orientation of the head of the given user at a given time instant. Optionally, in this regard, when the tracking means is implemented as the at least one tracking camera, the tracking data comprises a plurality of images (namely, visible-light images and/or IR images and/or depth images) representing at least the given eye and the head of the given user, wherein when processing the tracking data, the at least one processor is configured to employ at least one image processing algorithm. Such image processing algorithms are well-known in the art.

It will be appreciated that the at least one tracking camera is arranged to face the given user, to facilitate tracking at least the location of the given eye and of the head of the given user. Optionally, said location is represented in a given coordinate space. As an example, the given coordinate space may be a Cartesian coordinate space. It will also be appreciated that irrespective of where the at least one tracking camera is arranged, a relative location of the at least one tracking camera with respect to the optical combiner is fixed, and is pre-known to the at least one processor. This enables to determine the relative location of the first eye and of the second eye of the given user with respect to the optical combiner. Optionally, in this regard, a location of the first eye and of the second eye with respect to the at least one tracking camera is accurately known to the at least one processor, from the tracking data collected by the tracking means. Thus, the at least one processor can easily and accurately determine the relative location of the first eye and of the second eye with respect to the optical combiner, based on the relative location of the at least one tracking camera with respect to the optical combiner and the location of the first eye and of the second eye with respect to the at least one tracking camera. Optionally, the relative location of the first eye and of the second eye is represented in the given coordinate space.

Furthermore, optionally, the tracking means repeatedly tracks a location of both eyes of the given user throughout a given session of using the system. In such a case, the at least one processor is configured to repeatedly determine the relative location of the first eye and of the second eye with respect to the optical combiner (in real time or near-real time). Beneficially, this potentially allows for presenting the given user with an augmented view of the synthetic light field with the real-world light field in an autostereoscopic manner. Similarly, the tracking means repeatedly tracks a location and an orientation of the head of the given user, so that correction data (namely, the direction and the magnitude of the head movement) remains accurate and updated. It is to be understood that when the synthetic light field is being produced for a plurality of users simultaneously, the at least one processor is configured to determine a relative location of both eyes of each user from amongst the plurality of users in a similar manner, as discussed hereinabove. Moreover, the relative location of the first eye and of the second eye is determined with respect to the optical combiner, because the synthetic light field (that is being produced by the light field display unit) would be presented to the given user via the optical combiner only.

Throughout the present disclosure, the term "optical combiner" refers to specialised equipment that is capable of reflecting a corresponding part of the synthetic light field towards the given eye of the given user, whilst optically combining said part of the synthetic light field with the real-world light field. Optionally, the optical combiner is implemented by way of at least one of: a lens, a mirror, a semi-transparent mirror, a semi-transparent film, a semi-transparent flexible membrane, a prism, a beam splitter, an optical waveguide, a polarizer. Optical combiners are well-known in the art. It will be appreciated that when the light field image is to be displayed for a plurality of users (for example, in a scenario when the system is implemented in a vehicle having two or more users therein), some of the plurality of users may directly face the optical combiner (namely, in almost a straight manner), while a remainder of the plurality of users may face the optical combiner in a diagonal manner (namely, obliquely or sideways). Optionally, a tilt angle of the optical combiner with respect to an image plane of the light field display unit lies in a range of 10 degrees and 75 degrees. Optionally, when the system is in implemented in the vehicle, a windshield of the vehicle is utilised as the optical combiner. In such a case, the optical combiner would have a curved surface (namely, a curvature).

Throughout the present disclosure, the term "light field display unit" refers to specialised equipment that is capable of producing the synthetic light field. In other words, the light field display unit is utilised to display the light field image (generated by the at least one processor) to produce the synthetic light field at a given resolution. Optionally, the light field display unit is implemented in a form of any one of: a hogel-based light field display unit, a lenticular array based light field display unit, a parallax-barrier based light field display unit. All the aforementioned forms of light field display units are well-known in the art.

Optionally, the light field image comprises a plurality of pixels, wherein a first part of the light field image comprises a first set of pixels from amongst the plurality of pixels that is responsible for generating the first part of the synthetic light field that corresponds to the first eye, and a second part of the light field image comprises a second set of pixels from amongst the plurality of pixels that is responsible for generating the second part of the synthetic light field that corresponds to the second eye. It will be appreciated that, in the light field image, the pixels belonging to said first set are not arranged in a continuous manner across the light field image; similarly, the pixels belonging to said second set are also not arranged in a continuous manner across the light field image. Optionally, in the light field image, the pixels belonging to the first set and the pixels belonging to the second set may be arranged in alternating vertical stripes across a horizontal field of view of the light field image, wherein each vertical stripe comprises one or more scanlines of pixels. This is because humans perceive depth mainly based on horizontal binocular parallax. Thus, in this way, the light field image would be considerably different as compared to a conventional two-dimensional (2D) image that is displayed via conventional 2D displays, because the (single) light field image would comprise visual information corresponding to both the first eye and the second eye of the given user. In some implementations, the virtual content presented by the synthetic light field corresponds to at least one virtual object. Optionally, in this regard, the at least one processor is configured to generate the light field image from a perspective of the relative location of the first eye and of the second eye of the given user, by employing a three-dimensional (3D) model of the at least one virtual object. The term "virtual object" refers to a computer-generated object (namely, a digital object). Examples of the at least one virtual object may include, but are not limited to, a virtual navigation tool, a virtual gadget, a virtual message, a virtual entity, a virtual entertainment media, a virtual vehicle or part thereof, and a virtual information. The term "three-dimensional model" of the at least one virtual object refers to a data structure that comprises comprehensive information pertaining to the at least one virtual object. Such a comprehensive information is indicative of at least one of: a plurality of features of the at least one virtual object or its portion, a shape and a size of the at least one virtual object or its portion, a pose of the at least one virtual object or its portion, a material of the at least one virtual object or its portion, a colour and an optical depth of the at least one virtual object or its portion. The 3D model may be generated in the form of a 3D polygonal mesh, a 3D point cloud, a 3D surface cloud, a voxel-based model, or similar. Optionally, the 3D model is generated in the given coordinate space. Optionally, the at least one processor is configured to store the 3D model at a data repository that is communicably coupled to the at least one processor. The data repository may be implemented as a memory of the at least one processor, a memory of the light field display unit, a cloud-based database, or similar. Techniques for generating the light field image are well-known in the art.

Throughout the present disclosure, the term "real-world light field" refers to a light field emanating from the real-world environment in which the given user is present. Further, the term "synthetic light field" refers to a light field that is produced (namely, generated) synthetically by the light field display unit. It will be appreciated that in case of the real-world light field, light from, for example, a natural light source (such as the Sun) and/or an artificial light source (such as a lamp, a bulb, a tube-light, or similar), are reflected off (surfaces of) real-world objects (or their portions) to be incident towards the first eye and the second eye of the given user. In this way, visual information (for example, such as colour information, optical depth information, and the like) pertaining to said real-world objects is typically perceived by the left eye and the right eye. On the other hand, in case of the synthetic light field, light emanating from the light field display unit, upon reflecting off the optical combiner, is incident on the first eye and the second eye of the given user. In this way, visual information pertaining to the at least one virtual object (namely, the virtual content) can be perceived by the first eye and the second eye.

It will be appreciated that when the optical combiner reflects the first part and the second part of the synthetic light field towards the first eye and the second eye, respectively, it means that light produced by the first part in the light field image, generating the first part of the synthetic light field, is directed towards the first eye upon reflecting off (a surface of) the optical combiner. Simultaneously, light produced by the second part of the light field image, generating the second part of the synthetic light field, is directed towards the second eye upon reflecting off (the surface of) the optical combiner. Therefore, upon said reflection of the first part and the second part of the synthetic light field, visual information corresponding to the first part of the light field image and to the second part of the light field image is perceived by the first eye and the second eye, respectively. It is to be understood that due to binocular disparity, visual information for the first eye and visual information for the second eye would be slightly offset from each other. Beneficially, this enables in perceiving depth, when the virtual content is presented to the given user using the synthetic light field. The binocular disparity is well-known in the art. Additionally, when the first part and the second part of the synthetic light field are optically combined with the real-world light field, the virtual content is perceived by the left eye and the right eye, along with the visual information pertaining to at least one real-world object present in the real-world environment. Advantageously, this provides a result that is similar to displaying a combined view of a virtual image augmenting a real-world image to the given user.

Notably, the steps of determining, generating and displaying are repeatedly performed by the at least one processor for the given time period. In this regard, a sequence of light field images is generated, and then is displayed at the light field display unit in the given time period, wherein a given light field image is displayed thereat at a given time instant. It will be appreciated that the given time period may, for example, range from several seconds to several minutes, until calibration errors for the tracking means have been corrected (as discussed hereinbelow in detail).

It will be appreciated that there may be a scenario that when the virtual content is presented to the given user, the given user may likely to fixate his/her gaze on the portion of the virtual content. However, the portion of the virtual content may appear blurred (namely, out-of-focus) to the first eye and the second eye of the given user from a perspective of a current location of the head of the given user, i.e., the given user may find difficulty in focussing on (namely, clearly viewing) the portion of the virtual content from said perspective. In such a scenario, the given user typically (namely, naturally) tries to adjust a location of the head (by moving the head from the current location to a new location), whilst maintaining (namely, fixating) his/her gaze on the portion of the virtual content, in order to clearly view the portion of the virtual content from a perspective of the new location of the head. In some scenarios, when the given user has to make the head movement whilst fixating on said portion of the virtual content, it means that the portion of the virtual content (that is presented by the synthetic light field corresponding to the light field image) is likely not clearly visible (namely, appears to be blurry) to the given user. In other words, the given user is experiencing some trouble in clearly viewing the portion of the virtual content, and is moving his/her head (instinctively) in order to clearly view the portion of the virtual content. This also means that the current relative location of the first eye and of the second eye (which corresponds to the current location of the head) is incorrect, as the given user has to make the head movement. Thus, the current relative location of the first eye and of the second eye needs to be corrected (as discussed later). It is to be understood that greater the magnitude of the head movement, greater is the change in a location and/or an orientation of the head of the given user, and vice versa. For sideways head movements, rendering aberrations (such as poor phase correlation) are corrected and head pose-related correction amplifications could be applied. Moreover, the head is generally stable for over 5 seconds (for example, when the given user is present inside a vehicle, and is not in a process of settling-in after turning the head for reversing the vehicle, changing lanes on a road, sight-seeing, and the like). This could be defined as less than (+/−) 10 centimetres of a translation of the head of the given user along any axis, and less than 30 degrees of a rotation of the head along any axis.

Optionally, the at least one processor is configured to utilise the tracking means to determine a gaze direction of a given eye of the given user. Therefore, by repeatedly determining the gaze direction of the given eye, the at least one processor could easily ascertain when a gaze of the given user has been fixated during the given time period. It will be appreciated that "fixation" of the gaze of the given user means the gaze is maintained on at least a portion of the virtual content for a particular time period. Typically, a human eye is capable of resolving approximately 20 individual images per second. Thus, gaze fixation can be considered to have occurred, if the gaze has been fixated on at least the portion of the virtual content for a time period that may lie in a range of 250 milliseconds to 1500 milliseconds. In addition to this, since the tracking means is repeatedly tracking the head of the given user, the at least one processor could easily ascertain an initial location and an initial orientation of the head prior to making the head movement, and a new location and a new orientation of the head upon making the head movement. Using such information, the at least one processor could accurately determine the direction and the magnitude of the head movement. In an example, the head movement may be made by the given user by moving his/her head by 2 centimetres in a south-east direction with respect to a centre of a field-of-view of the given user.

It will be appreciated that once the direction and the magnitude of the head movement are known (as discussed hereinabove), the at least one processor could easily correct the current relative location of the first eye and of the second eye with respect to the optical combiner, because the first eye and the second eye are present at a fixed location on the head of the given user, and any head movement made by the given user may highly likely result in similar corresponding changes in the relative location of the first eye and of the second eye. Such a correction may involve employing geometric transformations (namely, geometric adjustments) on the (tracked) relative location of the first eye and of the second eye, based on the direction and the magnitude of the head movement. It will also be appreciated that the aforesaid correction may also involve utilising physiological models comprising comprehensive anatomical and biomechanical information pertaining to oculomotor system and head dynamics of a human. The technical benefit of correcting the current relative location of the first eye and of the second eye with respect to the optical combiner is that when the corrected current relative location of the first eye and of the second eye is utilised, the current light field image is accurately and realistically generated for producing the current synthetic light field presenting the virtual content. Beneficially, in this way, the portion of the virtual content would be clearly visible (namely, appears to be in-focus) to the left eye and the right eye of the given user, as presented via respective parts of the current synthetic light field. This enhances an overall viewing experience of the given user, for example, in terms of realism and immersiveness. It is to be understood that the virtual content (for example, the at least one virtual object) remains same for consecutive frames. It will be appreciated that the current light field image is generated and is displayed in a similar manner, as described earlier with respect to the light field image. Thus, information pertaining to generation of the current light field image and displaying of the current light field image is not described, for sake of brevity and avoiding repetition.

Optionally, the at least one processor is configured to:
after it is detected that the given user has made the head movement, whilst fixating on the portion of the virtual content,
detect whether the given user has made another head movement, whilst fixating on said portion or a neighbouring portion of the virtual content; and
when it is detected that the given user has not made another head movement, whilst fixating on said portion or a neighbouring portion of the virtual content,
correct subsequent relative locations of the first eye and of the second eye with respect to the optical combiner, based on the direction and the magnitude of the head movement, and optionally, re-calibrate the tracking means based on the direction and the magnitude of the head movement;
generate subsequent light field images, based on respective ones of the corrected subsequent relative locations of the first eye and of the second eye; and
display the subsequent light field images via the light field display unit to produce subsequent synthetic light fields presenting the virtual content.

In this regard, after the given user has made the head movement (as discussed earlier), when it is detected that the given user has not made the another head movement, it means that the given user has not adjusted the location of the head again to another new location, whilst fixating his/her gaze on said portion or the neighbouring portion of the virtual content, and thus can conveniently and clearly view said portion or the neighbouring portion of the virtual content from the perspective of the new location (that resulted from the head movement) itself. In other words, the given user could be considered to have found a 'sweet spot' for viewing said portion or the neighbouring portion of the virtual content, and need not require making any recurrent, subsequent head movements. Therefore, in such a case, the subsequent relative locations of the first eye and of the second eye could be easily corrected by the at least one processor by utilising the direction and the magnitude of the head movement in a similar manner, as described earlier with respect to the current relative location of the first eye and of the second eye. In an example implementation, when the virtual content pertains to a text to be read, the given user may likely fixate next on the neighbouring portion of the virtual content while reading the text. Moreover, the tracking means is optionally re-calibrated, based on the direction and the magnitude of the head movement in a manner that the corrected subsequent relative locations of the first eye and of the second eye are determined by the at least one processor by directly processing the tracking data that is collected by the (re-calibrated) tracking means. Such a re-calibration could be performed (at the tracking means itself) by applying geometric transformations on the tracking data, based on the direction and the magnitude of the head movement. Advantageously, such a re-calibration would ensure that same type of corrections are not required to be applied repeatedly by the at least one processor, and are already taken care of by the tracking means. In other words, this ensures that the tracking means remain accurate and precise over time, compensating for any changes in a location of the head dynamically.

The technical benefit of correcting the subsequent relative locations of the first eye and of the second eye is that the subsequent light field images are accurately and realistically generated for producing the subsequent synthetic light fields presenting the virtual content. Beneficially, in this way, the portion or the neighbouring portion of the virtual content would be clearly visible (namely, appears to be in-focus) to the left eye and the right eye of the given user, as presented via respective parts of each of the subsequent synthetic light fields. This enhances an overall viewing experience of the given user, for example, in terms of realism and immersiveness. It is to be understood that the virtual content would remain same for consecutive frames. It will be appreciated that the subsequent light field images are generated and are displayed in a similar manner, as described earlier with respect to the current light field image. Thus, information pertaining to generation of the subsequent light field images and displaying of the subsequent light field images is not described, for sake of brevity and avoiding repetition.

It will be appreciated that since the tracking means is repeatedly tracking a location and an orientation of the head of the given user, the at least one processor could easily ascertain, after it is detected that the given user has made the head movement, whether there is any further change in the location and the orientation of the head of the given user, in order to detect whether the given user has made the another head movement.

When there is no change in the location and the orientation of the head, it is detected that the given user has not made the another head movement. When there is a change in the location and the orientation of the head, it is detected that the given user has made the another head movement.

Optionally, the at least one processor is configured to:
while the subsequent light field images are being displayed, and if the virtual content pertains to a text to be read,
detect whether eyes of the given user are in a smooth pursuit, by utilising the tracking means; and
when it is detected that the eyes of the given user are in a smooth pursuit, re-calibrate the tracking means based on the direction and the magnitude of the head movement.

In this regard, when the virtual content pertains to the text to be read, the given user is likely to read the text when viewing the virtual content, and the eyes of the given user are highly likely to be in the smooth pursuit while reading the text (namely, while viewing the virtual content). Since the at least one processor generates the virtual content itself, information pertaining to whether the virtual content pertains to the text to be read could be already and accurately known to the at least one processor. It will be appreciated that when the eyes of the given user are in the smooth pursuit, it means that the eyes of the given user are actively tracking the virtual content, when the given user is viewing the virtual content.

It will also be appreciated that by processing the tracking data collected by the tracking means, the at least one processor could easily detect whether the eyes of the given user are in the smooth pursuit. For example, the at least one processor may identify that the eyes of the given user are moving in a raster-scan-like pattern when viewing the virtual content, wherein said raster-scan-like pattern is defined by consistent horizontal saccades, which occur as the eyes move across a line of said text, followed by brief fixations where the eyes pause to process said text. Additionally, vertical saccades are also detected at regular intervals, indicating a transition of the eyes from an end of one line in said text to a beginning of a next line in said text. Thus, by monitoring such repetitive sequences of horizontal and vertical movements, the at least one processor can accurately determine when the eyes of the given user are engaged in the smooth pursuit, such as during reading. Moreover, the at least one processor may also take into account at least one of: a gaze velocity, a gaze acceleration, of the eyes of the given user, for detecting whether the eyes are in the smooth pursuit. The at least one of: the gaze velocity, the gaze acceleration, could be known using information indicative of gaze directions of the eyes of the given user. Techniques for detecting smooth-pursuit eye movements are well-known in the art. Once it is detected that the eyes of the given user are in the smooth pursuit, it is ensured that the aforesaid corrections performed on the subsequent relative locations of the first eye and of the second eye (based on the direction and the magnitude of the head movement) are highly accurate and are well-applicable to the given user. Thus, the tracking means is optionally re-calibrated, according to the direction and the magnitude of the head movement in a same manner, as discussed earlier. Beneficially, the aforesaid re-calibration would ensure that, if the virtual content pertains to the text to be read and the eyes of the given user are in the smooth pursuit, same type of corrections (in the subsequent relative locations of the first eye and of the second eye) are not required to be applied repeatedly by the at least one processor, and are already taken care of by the tracking means. In other words, this ensures that the tracking means remain accurate and precise over time, compensating for any changes in a location of the head dynamically.

Optionally, the at least one processor is configured to:
when it is detected that the given user has made another head movement, whilst fixating on said portion or the neighbouring portion of the virtual content,
if a direction of the another head movement is opposite to said direction of the head movement, stop correcting subsequent relative locations of the first eye and of the second eye with respect to the optical combiner, based on the direction and the magnitude of the head movement.

In this regard, when it is detected that the given user has made the another head movement, and the direction of the another head movement is opposite to said direction of the head movement, it means that the given user has still not found the 'sweet spot' for viewing said portion or the neighbouring portion of the virtual content. Therefore, the at least one processor stops (namely, halts) performing any correction of the subsequent relative locations of the first eye and of the second eye, as it is not beneficial to correct the subsequent relative locations of the first eye and of the second eye because the given user is still not able to conveniently and clearly view said portion or the neighbouring portion of the virtual content despite making the another head movement. Even when any correction would still be performed on the subsequent relative locations of the first eye and of the second eye, it would be inaccurate and futile. Beneficially, stopping the aforesaid corrections may potentially facilitate in saving processing resources and processing time of the at least one processor. Optionally, when a dot product of a vector indicative of said head movement and a vector indicative of the another head movement is less than or equal to 0.1 square metres, wherein said head movement and the another head movement are determined in units of meters, it is detected that the direction of the another head movement is opposite to said direction of the head movement.

It will be appreciated that the given user would iteratively make subsequent another head movements whilst fixating his/her gaze on said portion or the neighbouring portion of the virtual content, until a given subsequent another head movement would result in a location of the head from a perspective of which the given user is able to conveniently and clearly view said portion or the neighbouring portion of the virtual content. Therefore, in such a case, the at least one processor is optionally configured to correct subsequent relative locations of the first eye and of the second eye with respect to the optical combiner, based on a direction and a magnitude of the subsequent another head movement.

It will also be appreciated that the given user could make several different head movements in different time instants, whilst fixating on respective portions of the virtual content, and the at least one processor could perform corrections on subsequent relative locations of the first eye and of the second eye with respect to the optical combiner, based on said several different head movements accordingly. However, such types of corrections would no longer be needed to be repeatedly performed by the at least one processor in future time instants, when the tracking means has been re-calibrated based on the aforesaid corrections. It will also be appreciated that the at least one processor may generate a bias vector map comprising a plurality of bias vectors, wherein a given bias vector is indicative of a correction performed on a relative location of a given eye of the given user with respect to an optical combiner, based on a direction and a magnitude of a given head movement made by the given user whilst fixating on a portion of virtual content. For a given session of using the system inside the vehicle, different bias vectors correspond different corrections performed based on different head movements made whilst fixating on respective portions of the virtual content.

Optionally, the at least one processor is configured to:
  store, at least temporarily, historical correction information pertaining to: (i) head movements made whilst fixating on respective portions of the virtual content, (ii) corrections performed based on said head movements, and (iii) respective portions of the optical combiner employed to reflect respective parts of the synthetic light field that present the respective portions of the virtual content towards the eyes of the given user;
  detect when a percentage of head movements that correspond to a given portion of the optical combiner in the historical correction information is greater than a first predefined threshold percent; and
  when it is detected that the percentage of the head movements that correspond to the given portion of the optical combiner in the historical correction information is greater than the first predefined threshold percent, re-calibrate the optical combiner based on the head movements that correspond to the given portion of the optical combiner in the historical correction information.

In this regard, the historical correction information is optionally stored, at least temporarily, at the data repository. Optionally, the at least one processor is configured to determine a given portion of the optical combiner employed to reflect a given part of the synthetic light field that presents a given portion of the virtual content, towards a given eye of the given user. In this regard, since the virtual content is generated by the at least one processor itself, the light field image is also displayed by the at least one processor, and information pertaining to a spatial configuration of the optical combiner can be pre-known to the at least one processor, it can be ascertained that where the given part of the synthetic light field incidents on the optical combiner (prior to a reflection of the given part) in order to determine the given portion of the optical combiner.

It will be appreciated that when it is detected that the percentage of the head movements is greater than the first predefined threshold percent, it may be highly likely that for a significant number of times, when the given part of the synthetic light field is reflected off the given portion of the optical combiner to incident towards the given eye of the given user, the given user has to make head movements consistently to clearly view the given portion of the virtual content, as compared to a case when the given part of the synthetic light field is reflected off other remaining portion(s) of the optical combiner, to incident towards the given eye of the given user. This may occur, for example, due to a change in a curvature of the given portion of the optical combiner (for example, due to a thermal stress, a mechanical stress, and the like), which may potentially cause light emanating from the light field display unit to reflect unevenly off a curved surface of the given portion of the optical combiner. Such an uneven reflection of the light may result in geometrical aberrations in the given part of the synthetic light field, due to which the given part of the synthetic light field may not be reflected towards the given eye in an accurate and intended manner, thereby causing the given user to consistently make the head movements. Therefore, in order to mitigate such a potential problem, the at least one processor re-calibrates the optical combiner, for example, to compensate for the change in the curvature of the given portion of the optical combiner. In an example, the given part of the synthetic light field may be pre-distorted prior to being incident on the given part of the optical combiner in a manner that it would compensate for anticipated geometrical aberrations upon reflecting off said part of the optical combiner. In this way, the given part of the synthetic light field would be reflected towards the given eye in a highly accurate and intended manner. Said pre-distortion could be applied by the at least one processor, based on the head movements that correspond to the given portion of the optical combiner. Optionally, the first predefined threshold percent lies in a range of 10 percent to 25 percent.

Optionally, the at least one processor is configured to:
  determine a focussing distance of eyes of the given user, by utilising the tracking means;
  when it is detected that the given user has made the head movement, whilst fixating on the portion of the virtual content,
    if the direction of the head movement is along a depth axis, correct the focussing distance of the eyes, based on the direction and the magnitude of the head movement, wherein the current light field image is generated further based on the corrected focussing distance of the eyes.

The term "focussing distance" refers to a distance between the eyes of the given user and a given object at which a gaze of the given user is focussed. Optionally, the at least one processor is configured to determine the focussing distance of the eyes of the given user, based on at least one of: a convergence of the gaze directions of the eyes of the given user, an intersection of a gaze direction of a given eye of the given user with a depth map. It will be appreciated that since an angle of convergence of the gaze directions of the eyes of the given user, an interpupillary distance (IPD) of the given user, a point of convergence of said gaze directions (namely, a gaze position) are known to the at least one processor, the focussing distance can be easily determined by the at least one processor, for example, using a triangulation technique. It will also be appreciated that when the gaze direction of the given eye and the depth map are known to the at least one processor, the focussing distance can be easily determined by the at least one processor, for example, by mapping the gaze direction onto the depth map. The term "depth map" refers to a data structure comprising information pertaining to optical depths of objects or their parts present in a real-world environment whereat the given user is present. Optionally, the depth map is in a form of a depth image that is captured by the at least one depth camera, wherein the optical depths of objects or their parts are measured along the depth axis (i.e., a Z-axis) of the at least one depth camera.

It will be appreciated that when the light field image is generated, the focussing distance of the eyes of the given user may be considered as an optical depth at which the portion of the virtual content is presented so far. However, when the given user has made the head movement, and if the direction of the head movement is along the depth axis (for example, such as either forward or backward along the depth axis), the focussing distance of the eyes also changes (namely, increases or decreases) accordingly. For example, when the head moves in a forward direction along the depth axis, an optical depth at which the portion of the virtual content is actually presented, is decreased. Similarly, when the head moves in a backward direction along the depth axis, an optical depth at which the portion of the virtual content is actually presented, is increased. In other words, the focussing distance of the eyes becomes incorrect when the given user has made the head movement, whilst fixating on the portion of the virtual content. Due to this, an overall viewing experience of the given user becomes unrealistic and non-immersive. Therefore, in order to mitigate this potential problem arising due to said head movement, the focussing distance of the eyes (namely, an optical depth at which the eyes of the given user are focussed) is corrected accordingly, by taking into account the direction and the magnitude of the head movement. This may be possible because the head movement in said direction would directly affect (namely, increase or decrease) the optical depth at which the eyes of the given user are focussed. Said correction may be performed by employing at least an arithmetic operation.

Beneficially, the corrected focussing distance is now considered as an optical depth at which the portion of the virtual content is to be presented, when generating the current light field image. In this way, the portion of the virtual content would be accurately and realistically perceived by the eyes of the given user (i.e., at an accurate optical depth), even if the direction of the head movement is along the depth axis. This enhances the overall viewing experience of the given user, for example, in terms of realism and immersiveness. The term "corrected focussing distance" refers to an optical depth at which the portion of the virtual content is to be presented to the given user, when generating the current light field image.

Optionally, the at least one processor is configured to:
store, at least temporarily, historical correction information pertaining to: (i) head movements made whilst fixating on respective portions of the virtual content, and (ii) corrections performed based on said head movements;
detect when a percentage of head movements whose direction is along the depth axis in the historical correction information is greater than a second predefined threshold percent; and
when it is detected that the percentage of the head movements whose direction is along the depth axis in the historical correction information is greater than the second predefined threshold percent, re-calibrate the tracking means based on the head movements whose direction is along the depth axis in the historical correction information.

In this regard, when the percentage of the head movements whose direction is along the depth axis is greater than the second predefined threshold percent, it may be highly likely that for a significant number of times, the focussing distance of the eyes changes (namely, increases or decreases) due to said head movements, as compared to a case when the direction of the head movement is not along the depth axis and the focussing distance of the eyes could be considered to be unaltered.

Therefore, in such a case, the tracking means is re-calibrated according to said head movements. Advantageously, such a re-calibration would ensure that, when the direction of the head movement is along the depth axis, same type of corrections in the focussing distance of the eyes are not required to be applied repeatedly by the at least one processor, and are already taken care of by the tracking means. In other words, this ensures that the tracking means remain accurate and precise over time, compensating for any changes in a location of the head dynamically. Optionally, the second predefined threshold percent lies in a range of 10 percent to 25 percent.

Optionally, when re-calibrating the tracking means, the at least one processor is configured to correct a mapping between interpupillary distances of the given user and focussing distances of the eyes of the given user. This may be because when the given user focusses on a nearby object (namely, when the focussing distance of the eyes is less than a predefined threshold distance, for example, such as 10 meters), pupils of the eyes of the given user constricts, causing a slight decrease in a distance between the irises of the eyes, and also in the interpupillary distance of the given user. Conversely, when the given user focusses on a far object (namely, when the focussing distance of the eyes is greater than the predefined threshold distance), pupils of the eyes of the given user dilate to allow additional light to enter the eyes. Such a dilation of the pupils results in a slight increase in the distance between the irises of the eyes, and also in the interpupillary distance of the given user. When said far object is assumed to be located at infinity or near-infinity, there would be a maximum distance between the irises of the eyes. The term "interpupillary distance" (IPD) refers to a distance between pupils of the eye of the given user, when the given user is looking at a given focussing distance. It is to be noted that greater the focussing distance of the eyes of the given user, greater is the IPD of the given user, and vice versa. For example, an IPD corresponding to a focussing distance of 10 meters is more than an IPD corresponding to a focussing distance of 1 meter. It will be appreciated that the aforesaid mapping could be generated in form of a data structure (for example, such as a lookup table), a database, or could be learned and stored in the form of a machine learning model. The mapping could also be stored in a text-based file format or comma-separated values (CSV)-based file format. It is to be noted that the aforesaid mapping is specific to the given user.

Optionally, when the tracking means is implemented as the at least one tracking camera, the at least one processor is configured to: capture a plurality of images of a face of the given user at different time instants, using the at least one tracking camera; and determine the IPD of the given user, based on a plurality of tracking parameters determined by processing a given image, wherein the plurality of tracking parameters comprises: a pose of a head of the given user, positions of eyeballs of the eyes of the given user, and at least one of: relative positions of irises of the eyes with respect to boundaries of the eyeballs, relative positions of irises of the eyes with respect to corners of the eyes, shapes of the eyes.

Optionally, the at least one processor is configured to: when it is detected that the given user has made the head movement, whilst fixating on the portion of the virtual content,
  determine whether the head movement is voluntary or involuntary; and
  correct the current relative location of the first eye and of the second eye, based on the direction and the magnitude of the head movement, only when the head movement is voluntary.

In this regard, the at least one processor determines whether the head movement is deliberately (namely, voluntarily) made by the given user, when the given user is actually trying to find the 'sweet spot' for viewing said portion of the virtual content (as discussed earlier), or whether the head movement is made unintentionally (namely, involuntarily), for example, in a case where the system is implemented in a vehicle in which the given user is present, and said vehicle is moving. In an example, the at least one processor may process the tracking data collected by the tracking means to ascertain at least one of: patterns of head movements of the given user, a velocity of a head of the given user, an acceleration of the head of the given user, a frequency and a duration of said head movements, in order to determine whether the head movement is voluntary or involuntary. In this regard, a voluntary head movement can be typically identified to be smooth, purposeful, moderate in speed, and correlated with an external stimuli, and often showing a gradual start and stop. Conversely, an involuntary head movement can be typically identified to be erratic, rapid, and spontaneous.

It will be appreciated that when the head movement is involuntary, it would not be beneficial to correct the current relative location of the first eye and of the second eye, because the given user is not actually moving his/her head to view said portion of the virtual content. In such a case, the at least one processor can skip performing the correction of the current relative location of the first eye and of the second eye with respect to the optical combiner. This may, particularly, be beneficial in a scenario where the vehicle is moving on a bumpy road and there would be significant involuntary head movements made by the given user due to sudden movements and vibrations from the vehicle experienced by the given user. Beneficially, this may potentially facilitate in saving the processing resources and the processing time of the at least one processor. On the other hand, when the head movement is voluntary, it would be beneficial to correct the current relative location of the first eye and of the second eye with respect to the optical combiner, because the given user is actually trying to adjust his/her head for viewing said portion of the virtual content.

Optionally, the system is implemented in a vehicle, the system further comprising at least one sensor employed to sense at least one of: an acceleration, an orientation of the vehicle, wherein the at least one processor is configured to:
  determine a vehicular acceleration signal for a first time period, based on the at least one of: the acceleration, the orientation of the vehicle sensed during the first time period, wherein the vehicular acceleration signal is indicative of a change in at least one of: the acceleration, the orientation of the vehicle;
  apply at least one transformation to the vehicular acceleration signal to generate a head acceleration signal for a second time period, wherein the head acceleration signal is indicative of a change in at least one of: an acceleration, an orientation of a head of the given user;
  determine an expected head movement of the given user, based on the head acceleration signal;
  detect an actual realised head movement of the given user during the second time period, by utilising the tracking means; and
  determine the direction and the magnitude of the head movement, by subtracting the expected head movement from the actual realised head movement.

Herein, the term "sensor" refers to an equipment that is operable to detect (namely, sense) the acceleration and/or the orientation of the vehicle. Optionally, the at least one sensor comprises at least one of: at least one accelerometer, at least one gyroscopic sensor. Optionally, the at least one sensor further comprises at least one magnetometer. It is to be understood that the at least one accelerometer could be employed to sense changes in the acceleration of the vehicle. The at least one gyroscopic sensor could be employed to sense changes in the orientation of the vehicle (for example, such as in terms of pitch, roll, and yaw angles). The at least one magnetometer could be employed to sense changes in the orientation of the vehicle relative to the Earth's magnetic field. It will be appreciated that the at least one accelerometer, the at least one gyroscopic sensor, and the at least one magnetometer could be parts of an inertial measurement unit (IMU) or a triaxial inertial measurement unit (TIMU). Accelerometers, gyroscopic sensors, magnetometers, IMUs, and TIMUs are well-known in the art. Optionally, the at least one processor is configured to process sensor data, collected by the at least one sensor, to determine the acceleration and/or the orientation of the vehicle at a given time instant. The sensor data may be in form of IMU/TIMU values, motion sensor data values, magnetic field strength values, or similar. It will be appreciated that the at least one sensor repeatedly collects the sensor data throughout the given session of using the system. Accordingly, the at least one processor is optionally configured to repeatedly process the sensor data to determine the acceleration and/or the orientation of the vehicle. The vehicle could, for example, be a car, a truck, an aircraft, a speed boat or the like.

The term "vehicular acceleration signal" refers to a digital signal which indicates a change in the acceleration of the vehicle and/or a change in the orientation of the vehicle. Greater the amplitude of the vehicular acceleration signal, greater is the change in the at least one of: the acceleration, the orientation of the vehicle, and vice versa. It is to be understood that the acceleration of the vehicle may change in various scenarios, for example, such as when the vehicle starts moving from a stationary position, when brakes are applied to slow down or stop the vehicle, when the vehicle is accelerated to increase its speed, when the vehicle is driven downhill, when the vehicle is driven uphill, when the vehicle is making a turn, when the vehicle is driven on an uneven road (namely, a road having bumps and/or potholes), and the like. Similarly, the orientation of the vehicle may change in various scenarios, for example, such as when the vehicle is making a turn, when the vehicle is laterally shifted while switching lanes on a multi-lane road, when the vehicle is being parked at a parking spot or exiting from the parking spot, and the like. It will be appreciated that since the at least one sensor is employed to repeatedly sense the acceleration and/or the orientation of the vehicle, the at least one processor can easily and accurately determine the change in the acceleration and/or the orientation of the vehicle for the first time period, for example, by processing the sensor data collected by the at least one sensor during the first time period. Optionally, the first time period lies in a range of 10 milliseconds to 1000 milliseconds; more optionally, in a range of 10 milliseconds to 500 milliseconds; yet more optionally, in a range of 10 milliseconds to 200 milliseconds. When the first time period lies in any of the aforesaid ranges, the first time period is understood to be a very short time period.

The term "transformation" refers to an operation that is applied to the vehicular acceleration signal to generate the head acceleration signal. It will be appreciated that when applying the at least one transformation to the vehicular acceleration signal, the at least one processor is optionally configured to modify the vehicular acceleration signal by taking into account how the position and/or the orientation of the head of the given user is likely to change according to the change in the acceleration and/or the orientation of the vehicle, to generate the head acceleration signal. Such a modification may involve using one or more signal processing techniques, for example, such as a filtering technique, a smoothing technique, a scaling technique, and the like.

Further, the term "head acceleration signal" refers to a digital signal which indicates an expected change in the at least one of: the acceleration, the orientation of the head of the given user, based on the vehicular acceleration signal. Greater the amplitude of the head acceleration signal, greater is the expected change in the acceleration and/or the orientation of the head of the given user, and vice versa. It is to be noted that greater the amplitude of the vehicular acceleration signal, greater is the amplitude of the head acceleration signal, and vice versa; however, the amplitude of the head acceleration signal is considerably smaller as compared to the amplitude of the vehicular acceleration signal. This is because the given user is assumed to be wearing a seat belt while sitting inside the vehicle. Additionally, suspension settings of the vehicle and a biomechanical structure and musculature of a human act as a buffer for absorbing and dampening an impact of the vehicular acceleration signal on the head of the given user. Therefore, the head would likely experience lesser change in the acceleration and/or the orientation as compared to the vehicle, in response to same factors such as changes in speed, road conditions, driving manoeuvres, and the like. In other words, the head would receive an attenuated impact of said change in the acceleration and/or the orientation of the vehicle. This results in a lower amplitude of the head acceleration signal.

In some implementations, the second time period partially overlaps with the first time period. In such implementations, the second time period starts after a start of the first time period, but before the first time period ends, and the second time period ends after the first time period has ended. In other implementations, the second time period does not overlap with the first time period at all. In such implementations, the second time period starts (just) after the first time period has ended. The second time period is different from the first time period, irrespective of whether it overlaps with the first time period or not. This may be because when the vehicle is in motion, any change in the acceleration and/or the orientation of the vehicle highly likely affects (namely, changes) the position and/or the orientation of the head of the given user after a certain amount of time has passed. In other words, such an impact may not be received by the head concurrently, but is rather received after some time. Therefore, the head acceleration signal is generated for the second time period that may partially overlap with the first time period, or that may not overlap with the first time period at all. In an example, the head of the given user may likely receive an impact of the vehicular acceleration signal after 50 milliseconds. In such an exemplary scenario, if the first time period is taken as 200 milliseconds, there would be an overlap between the second time period and the first time period.

However, if the first time period is taken as only 30 milliseconds, there may not be any overlap between the second time period and the first time period, because the second time period starts after 50 milliseconds from the start of the first time period.

Once the head acceleration signal is generated, the at least one processor determines the expected head movement of the given user, namely, an anticipated or a predicted motion of the head of the given user. It will be appreciated that since the at least one processor has a knowledge of how much the acceleration and/or the orientation of the head of the given user is expected to change with respect to time, the at least one processor can easily and accurately predict a motion of the head of the given user accordingly. For example, the change in the acceleration of the head of the given user may be integrated with respect to time, to determine an expected velocity of the head, and then the expected velocity of the head may be integrated with respect to time to determine an expected displacement (namely, a change in the position of the head or an expected position) of the head. Moreover, the change in the orientation of the head of the given user could be utilised to determine an expected orientation of the head.

Since the tracking means repeatedly tracks the position and the orientation of the head of the given user, the at least one processor can easily and accurately ascertain how the head of the given user has actually moved during the second time period (by using tracked positions and tracked orientations of the head during the second time period), to determine the actual realised head movement.

It will be appreciated that different users may have different driving styles and may have different physiological responses to the change in the acceleration and/or the orientation of the vehicle. For example, when there is a change in the acceleration and/or the orientation of the vehicle, some users may prefer to maintain a firm grip on a steering wheel of the vehicle while driving the vehicle and make minimal head movements (i.e., the change in acceleration and/or orientation of their heads is minimal), while other users may have a tendency to make frequent and exaggerated head movements, leading to a bobble-head effect (i.e., the change in acceleration and/or orientation of their heads is significant). In addition to this, there may also be variations in environmental conditions (for example, such as, a surface of a road, a traffic density, a weather condition, and the like). In such scenarios, the expected head movement and the actual realised head movement may be considerably different from each other. Therefore, the direction and the magnitude of the head movement made by the given user to find the 'sweet spot' for viewing said portion of the virtual content (as discussed earlier), are determined by subtracting the expected head movement from the actual realised head movement. Beneficially, both the expected head movement (that is determined based on the head acceleration signal) and the actual realised head movement are taken into account for determining the head movement, for example, even when in some cases, directions of both the expected head movement and the actual realised head movement are opposite. The aforesaid subtraction could be a vector-based subtraction.

The present disclosure also relates to the method as described above. Various embodiments and variants disclosed above, with respect to the aforementioned first aspect, apply mutatis mutandis to the method.

Optionally, the method further comprises:
after it is detected that the given user has made the head movement, whilst fixating on the portion of the virtual content,
  detecting whether the given user has made another head movement, whilst fixating on said portion or a neighbouring portion of the virtual content; and
  when it is detected that the given user has not made another head movement, whilst fixating on said portion or a neighbouring portion of the virtual content,
    correcting subsequent relative locations of the first eye and of the second eye with respect to the optical combiner, based on the direction and the magnitude of the head movement, and optionally, re-calibrating the tracking means based on the direction and the magnitude of the head movement;
    generating subsequent light field images, based on respective ones of the corrected subsequent relative locations of the first eye and of the second eye; and
    displaying the subsequent light field images via the light field display unit for producing subsequent synthetic light fields presenting the virtual content.

Optionally, the method further comprises:
while the subsequent light field images are being displayed, and if the virtual content pertains to a text to be read,
  detecting whether eyes of the given user are in a smooth pursuit, by utilising the tracking means; and
  when it is detected that the eyes of the given user are in a smooth pursuit, re-calibrating the tracking means based on the direction and the magnitude of the head movement.

Optionally, the method further comprises:
when it is detected that the given user has made another head movement, whilst fixating on said portion or the neighbouring portion of the virtual content,
  if a direction of the another head movement is opposite to said direction of the head movement, stopping correcting subsequent relative locations of the first eye and of the second eye with respect to the optical combiner, based on the direction and the magnitude of the head movement.

Optionally, the method further comprises:
storing, at least temporarily, historical correction information pertaining to: (i) head movements made whilst fixating on respective portions of the virtual content, (ii) corrections performed based on said head movements, and (iii) respective portions of the optical combiner employed to reflect respective parts of the synthetic light field that present the respective portions of the virtual content towards the eyes of the given user;
detecting when a percentage of head movements that correspond to a given portion of the optical combiner in the historical correction information is greater than a first predefined threshold percent; and
when it is detected that the percentage of the head movements that correspond to the given portion of the optical combiner in the historical correction information is greater than the first predefined threshold percent, re-calibrating the optical combiner based on the head movements that correspond to the given portion of the optical combiner in the historical correction information.

Optionally, the method further comprises:
determining a focussing distance of eyes of the given user, by utilising the tracking means;
when it is detected that the given user has made the head movement, whilst fixating on the portion of the virtual content,
  if the direction of the head movement is along a depth axis, correcting the focussing distance of the eyes, based on the direction and the magnitude of the head movement,
  wherein the current light field image is generated further based on the corrected focussing distance of the eyes.

Optionally, the method further comprises:
storing, at least temporarily, historical correction information pertaining to: (i) head movements made whilst fixating on respective portions of the virtual content, and (ii) corrections performed based on said head movements;
detecting when a percentage of head movements whose direction is along the depth axis in the historical correction information is greater than a second predefined threshold percent; and
when it is detected that the percentage of the head movements whose direction is along the depth axis in the historical correction information is greater than the second predefined threshold percent, re-calibrating the tracking means based on the head movements whose direction is along the depth axis in the historical correction information.

Optionally, the method further comprises:
when it is detected that the given user has made the head movement, whilst fixating on the portion of the virtual content,
  determining whether the head movement is voluntary or involuntary; and
  correcting the current relative location of the first eye and of the second eye, based on the direction and the magnitude of the head movement, only when the head movement is voluntary.

Optionally, the method further comprises:
determining a vehicular acceleration signal for a first time period, based on at least one of: an acceleration, an orientation of a vehicle sensed by at least one sensor during the first time period, wherein the vehicular acceleration signal is indicative of a change in at least one of: the acceleration, the orientation of the vehicle;

applying at least one transformation to the vehicular acceleration signal for generating a head acceleration signal for a second time period, wherein the head acceleration signal is indicative of a change in at least one of: an acceleration, an orientation of a head of the given user;

determining an expected head movement of the given user, based on the head acceleration signal;

detecting an actual realised head movement of the given user during the second time period, by utilising the tracking means; and determining the direction and the magnitude of the head movement, by subtracting the expected head movement from the actual realised head movement.

DETAILED DESCRIPTION OF THE DRAWINGS

Referring to FIG. 1, illustrated is a block diagram of an architecture of a system 100 for on-the-fly correction of calibration errors based on a user experience, in accordance with an embodiment of the present disclosure. With reference to FIG. 1, the system 100 comprises tracking means 102, a light field display unit 104, an optical combiner 106, and at least one processor (for example, depicted as a processor 108). Optionally, the system 100 further comprises at least one sensor (for example, depicted as a sensor 110). The processor 108 is communicably coupled to the tracking means 102 and light field display unit 104, and optionally, to the sensor 110. The processor 108 is configured to perform various operations, as described earlier with respect to the aforementioned first aspect.

It may be understood by a person skilled in the art that FIG. 1 includes a simplified architecture of the system 100, for sake of clarity, which should not unduly limit the scope of the claims herein. It is to be understood that the specific implementation of the system 100 is provided as an example and is not to be construed as limiting it to specific numbers or types of tracking means, optical combiners, processors, sensors, and light field display units. The person skilled in the art will recognize many variations, alternatives, and modifications of embodiments of the present disclosure.

Figure 2:
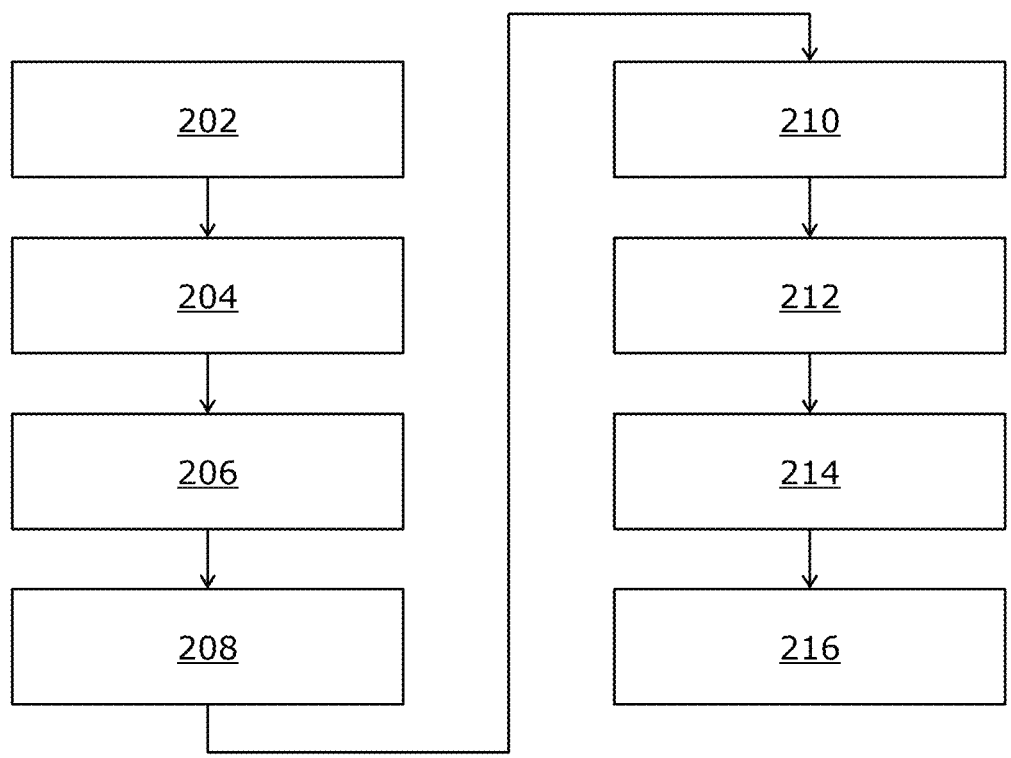
FIG. 2 illustrates steps of a method for on-the-fly correction of calibration errors based on user experience, in accordance with an embodiment of the present disclosure.

Referring FIG. 2, illustrated are steps of a method for on-the-fly correction of calibration errors based on a user experience, in accordance with an embodiment of the present disclosure. With reference to FIG. 2, at step 202, a relative location of a first eye and of a second eye of a given user with respect to an optical combiner, is determined by utilising tracking means, wherein the optical combiner is arranged on an optical path of a light field display unit and on an optical path of a real-world light field of a real-world environment. At step 204, a light field image is generated, based on the relative location of the first eye and of the second eye of the given user with respect to the optical combiner. At step 206, the light field image is displayed via the light field display unit to produce a synthetic light field presenting virtual content, wherein the optical combiner is employed to reflect a first part and a second part of the synthetic light field towards the first eye and the second eye of the given user, respectively, whilst optically combining the first part and the second part of the synthetic light field with the real-world light field. At step 208, the steps of determining, generating and displaying are repeated for a given time period. During the given time period, at step 210, it is detected that when the given user has made a head movement, whilst fixating on a portion of the virtual content.

When it is detected that the given user has made a head movement, whilst fixating on a portion of the virtual content, at step 212, a current relative location of the first eye and of the second eye with respect to the optical combiner, is corrected based on a direction and a magnitude of the head movement.

At step 214, a current light field image is generated, based on the corrected current relative location of the first eye and of the second eye. At step 216, the current light field image is displayed via the light field display unit to produce a current synthetic light field presenting the virtual content.

The aforementioned steps are only illustrative and other alternatives can also be provided where one or more steps are added, one or more steps are removed, or one or more steps are provided in a different sequence without departing from the scope of the claims.

Figure 3A:
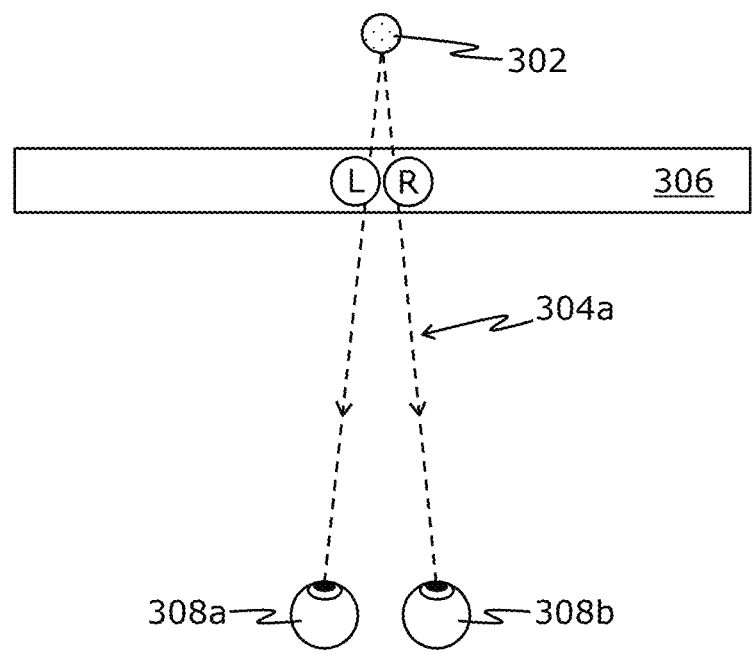
Figure 3B:
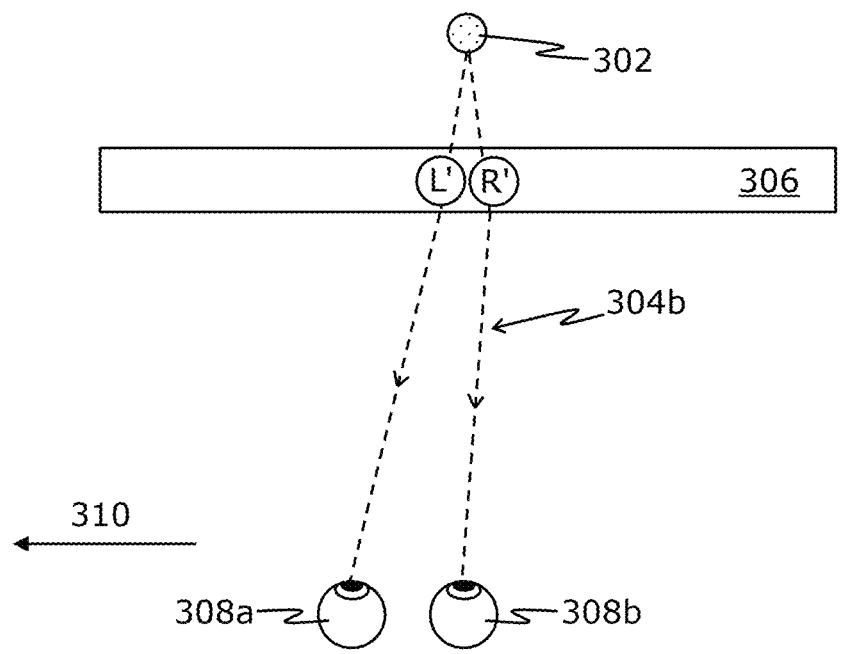
FIG. 3B illustrates another exemplary scenario of presenting the virtual content to the given user after the given user has made the head movement, in accordance with an embodiment of the present disclosure.

Referring to FIGS. 3A and 3B, FIG. 3A illustrates an exemplary scenario of presenting virtual content 302 (for example, depicted using a circle having a dotted pattern) to a given user before the given user has made a head movement, while FIG. 3B illustrates another exemplary scenario of presenting the virtual content 302 to the given user after the given user has made the head movement, in accordance with an embodiment of the present disclosure. With reference to FIGS. 3A and 3B, the given user has made the head movement, whilst fixating on the virtual content 302. With reference to FIG. 3A, the virtual content 302 is presented to the given user by producing a synthetic light field 304a using a light field display unit, when a light field image is displayed via the light field display unit, wherein an optical combiner 306 is employed to reflect a first part L and a second part R of the synthetic light field 304a towards a first eye 308a and a second eye 308b of the given user, respectively, and wherein the optical combiner 306 is arranged on an optical path of the light field display unit and on an optical path of a real-world light field of a real-world environment. In this scenario, the virtual content 302 appears blurred (namely, out-of-focus) to the first eye 308a and the second eye 308b from a perspective of a current location of a head of the given user.

With reference to FIG. 3B, since the virtual content 302 appears blurred as discussed in FIG. 3A, the given user makes the head movement in along a direction 310 to adjust a location of the head from the current location to a new location, whilst fixating on the virtual content 302, in order to clearly view the virtual content 302 from a perspective of the new location. In such a case, a current relative location of the first eye 308a and of the second eye 308b with respect to the optical combiner 306 is corrected, based on a direction and a magnitude of the head movement. Upon such correction, the virtual content 302 is presented to the given user by producing a current synthetic light field 304b using the light field display unit, when a current light field image is displayed via the light field display unit, wherein the optical combiner 306 is employed to reflect a first part L' and a second part R' of the current synthetic light field 304b towards the first eye 308a and the second eye 308b of the given user, respectively.

Figure 4:
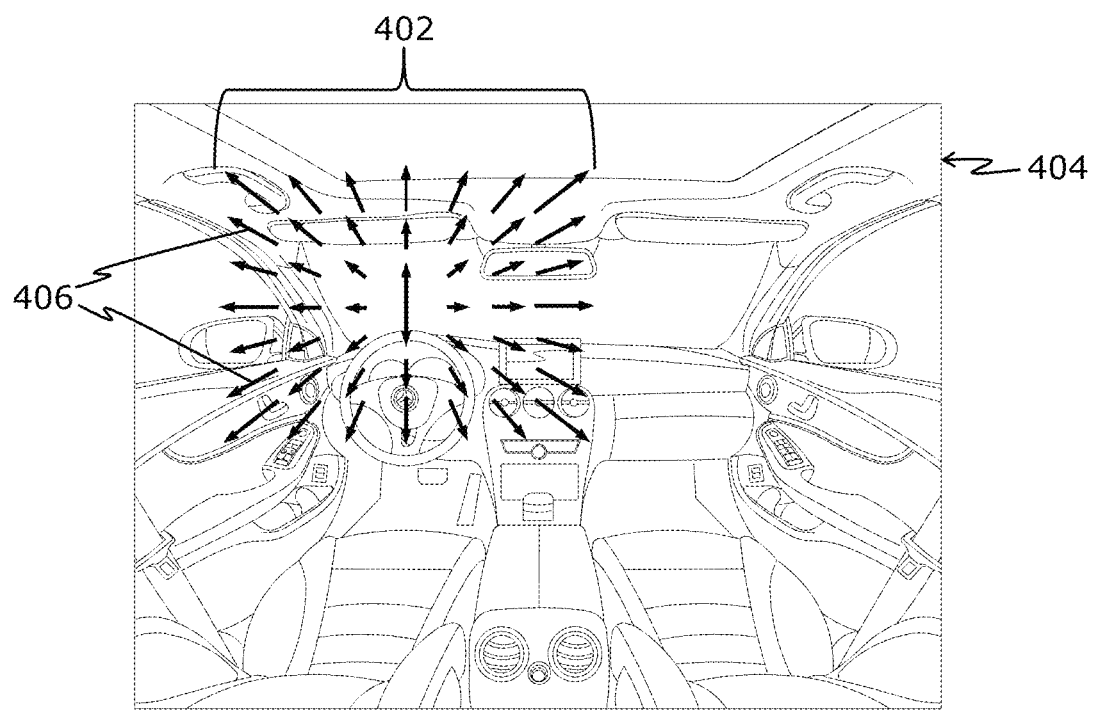
FIG. 4 illustrates an exemplary bias vector map generated for a given user present inside a vehicle in which a system for on-the-fly correction of calibration errors based on a user experience, is implemented, in accordance with an embodiment of the present disclosure.

Referring to FIG. 4, illustrated is an exemplary bias vector map 402 generated for a given user present inside a vehicle 404 in which a system (not shown) for on-the-fly correction of calibration errors based on a user experience, is implemented, in accordance with an embodiment of the present disclosure. With reference to FIG. 4, the bias vector map 402 represents a plurality of bias vectors 406 (depicted using solid-line arrows), wherein a given bias vector is indicative of a correction performed on a relative location of a given eye of the given user with respect to an optical combiner, based on a direction and a magnitude of a given head movement made by the given user whilst fixating on a portion of virtual content. For a given session of using the system inside the vehicle 404, different bias vectors correspond different corrections performed based on different head movements made whilst fixating on respective portions of the virtual content. For illustration purposes, the bias vector map 402 is shown to be simplified and less dense; however, in reality, the bias vector map 402 is complicated and highly dense. Herein, the vehicle 404 is shown as a car.

Figure 5A:
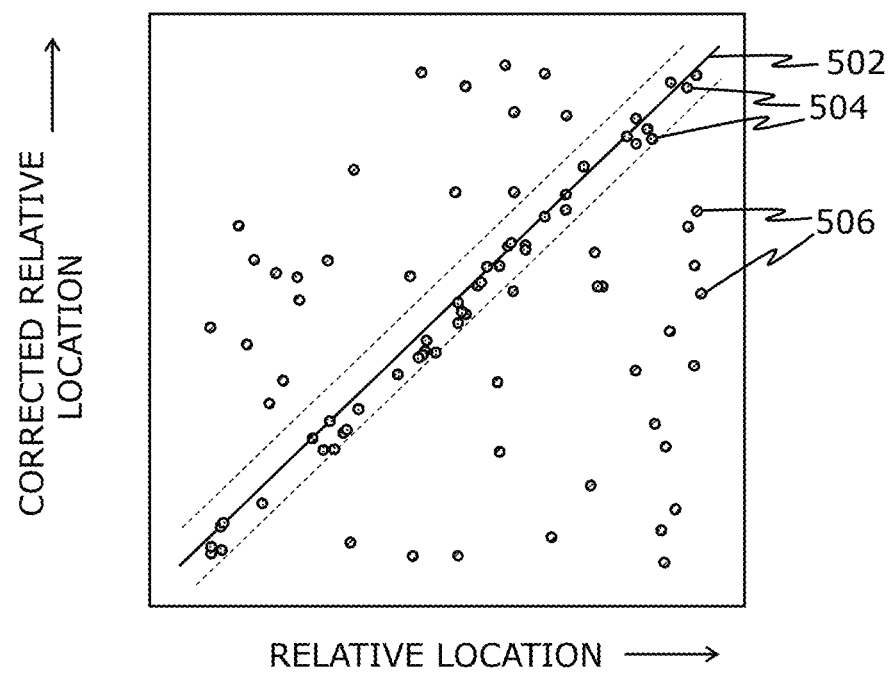
Figure 5B:
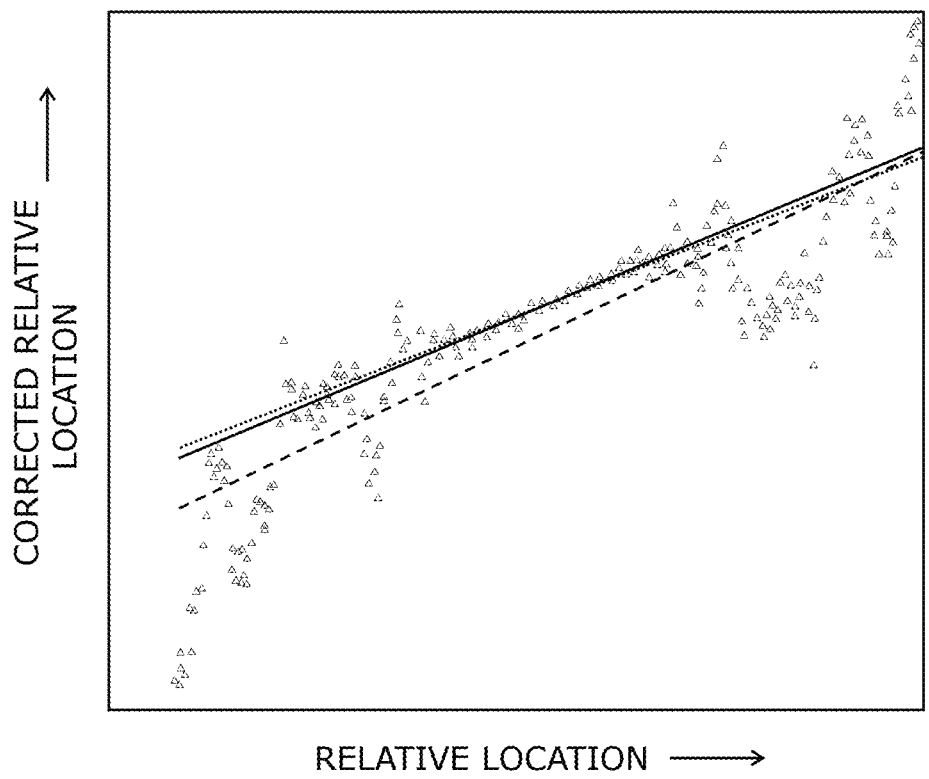
FIG. 5B illustrates different exemplary best-fit lines obtained by employing different curve fitting techniques for the linear regression employed for re-calibrating the tracking means, in accordance with an embodiment of the present disclosure.

Referring to FIGS. 5A and 5B, FIG. 5A illustrates an exemplary linear regression employed for re-calibrating tracking means, while FIG. 5B illustrates different exemplary best-fit lines obtained by employing different curve fitting techniques for the linear regression employed for re-calibrating the tracking means, in accordance with an embodiment of the present disclosure. With reference to FIG. 5A, the linear regression is employed to obtain a best-fit line 502 that most closely fits data pertaining to a relative location of a given eye of a given user with respect to an optical combiner (namely, an independent variable), and a corrected relative location of the given eye of the given user with respect to the optical combiner (namely, a dependent variable), based on a specific mathematical function between said relative location and corrected relative location. Data points 504 (depicted using small circles having a dotted pattern) lying close to the best-fit line 502, are referred to as inliers, whereas data points 506 (depicted using small circles having a dashed pattern) lying significantly far from the best-fit line 502, are referred to as outliers. Such a linear regression is employed for re-calibrating the tracking means, such that the re-calibrated tracking means can be utilised for correcting the relative location of the given eye of the given user on its own, for future time instants.

With reference to FIG. 5B, the linear regression (same as discussed with reference to FIG. 5A) is employed to obtain three different best-fit lines corresponding to three different curve fitting techniques. The best-fit line depicted using a solid line is obtained using a Fourier series curve (FSC) fitting technique. The best-fit line depicted using a dotted line is obtained using a Random Sample Consensus (RANSAC) fitting technique. The best-fit line depicted using a dashed line is obtained using a Least Squares Fitting (LSF) technique. Herein, for sake of simplicity and clarity, all data points are depicted using small triangles.

Figure 6:
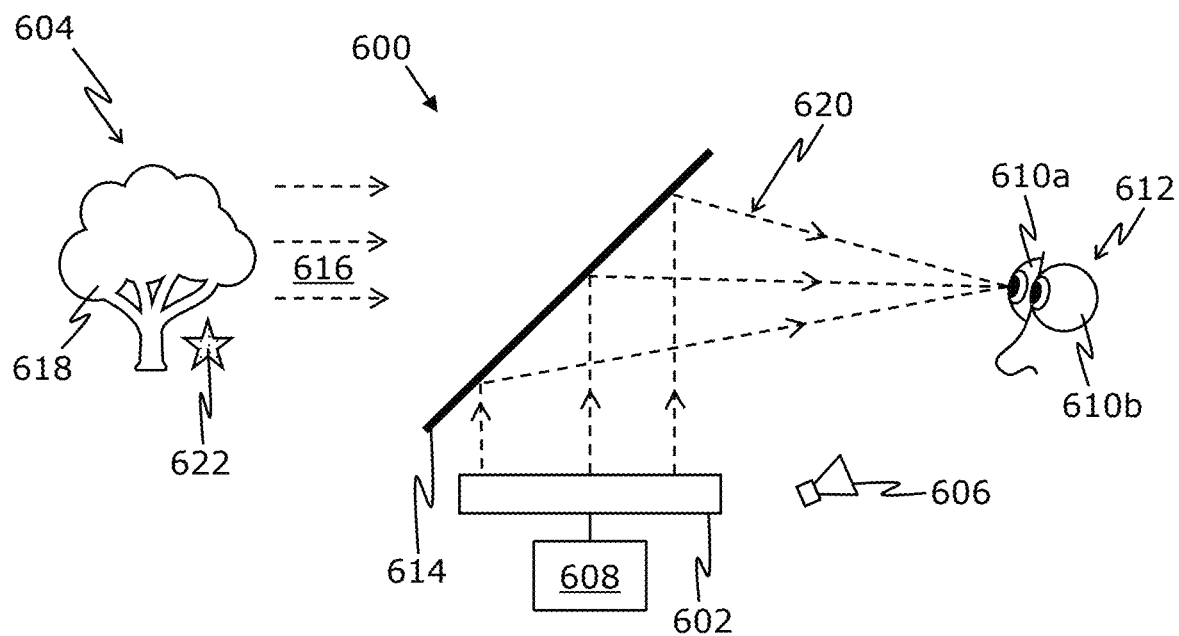
FIG. 6 illustrates an exemplary scenario in which a synthetic light field is produced using a light field display unit, and is optically combined with a real-world light field using an optical combiner, in accordance with an embodiment of the present disclosure.

Referring to FIG. 6, illustrated is an exemplary scenario 600 in which a synthetic light field 620 is produced using a light field display unit 602, and is optically combined with a real-world light field 616 using an optical combiner 614, in accordance with an embodiment of the present disclosure. With reference to FIG. 6, a real-world environment 604 is shown, wherein tracking means 606 is utilised by at least one processor (depicted as a processor 608) to determine a relative location of a first eye 610a and of a second eye 610b of a user 612 with respect to an optical combiner 614, the optical combiner 614 being arranged on the optical path of the light field display unit 602 and on an optical path of the real-world light field 616 of the real-world environment 604. In the real-world environment 604, there are one or more real-world objects, depicted as a real-world object 618 (for example, depicted as a tree), which are present within a field of view of the user 612. The tracking means 606 is shown to be implemented, for example, as a tracking camera. A light field image that is to be displayed via the light field display unit 602 is generated by the processor 608, based on the relative location of the first eye 610a and of the second eye 610b of the user 612 with respect to the optical combiner 614. The light field image is displayed via the light field display unit 602 to produce the synthetic light field 620 presenting virtual content 622, for example, such as a virtual object (depicted as a star having a dotted pattern). For illustration purposes only, the virtual content 622 is shown to be presented at an optical depth that is (almost) same as an optical depth of the real-world object 618. The optical combiner 614 is employed to reflect a first part and a second part of the synthetic light field 620 towards the first eye 610a and the second eye 610b, respectively, whilst optically combining the first part and the second part of the synthetic light field 620 with the real-world light field 616.

Figure 7:
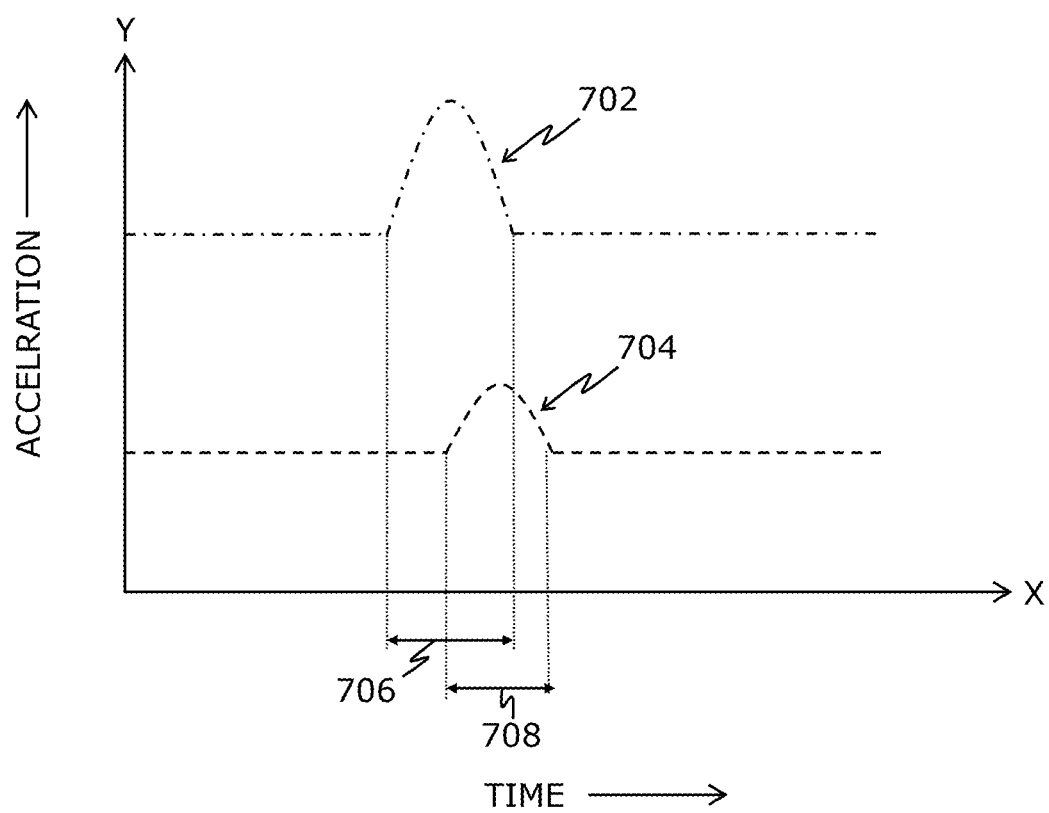
FIG. 7 illustrates an exemplary graphical representation for a vehicular acceleration signal and a head acceleration signal, in accordance with an embodiment of the present disclosure.

Referring to FIG. 7, illustrated is an exemplary graphical representation for a vehicular acceleration signal 702 (for example, depicted using a dash-dot line curve) and a head acceleration signal 704 (for example, depicted using a dashed line curve), in accordance with an embodiment of the present disclosure. With reference to FIG. 7, a positive X-axis represents time, and a positive Y-axis represents an acceleration. The vehicular acceleration signal 702 is indicative of a change in at least one of: an acceleration, an orientation of a vehicle (for example, a car) sensed (by at least one sensor) during a first time period 706. The head acceleration signal 704 is indicative of a change in at least one of: an acceleration, an orientation of a head of at least one user sitting inside the vehicle. For sake of simplicity, only acceleration has been depicted in the exemplary graphical representation. The head acceleration signal 704 is generated for a second time period 708, by applying at least one transformation to the vehicular acceleration signal 702. The second time period 708 is shown to be partially overlapping with the first time period 706 in a manner that the second time period 708 starts after a start of the first time period 706, and ends after the first time period 706 has ended.

FIGS. 3A, 3B, 4, 5A, 5B, 6 and 7 are merely examples, which should not unduly limit the scope of the claims herein. A person skilled in the art will recognize many variations, alternatives, and modifications of embodiments of the present disclosure.

The invention claimed is:

1. A system comprising:
   tracking means;
   a light field display unit;
   an optical combiner arranged on an optical path of the light field display unit and on an optical path of a real-world light field of a real-world environment; and
   at least one processor configured to:
   determine a relative location of a first eye and of a second eye of a given user with respect to the optical combiner, by utilising the tracking means;
   generate a light field image, based on the relative location of the first eye and of the second eye of the given user with respect to the optical combiner;
   display the light field image via the light field display unit to produce a synthetic light field presenting virtual content, wherein the optical combiner is employed to reflect a first part and a second part of the synthetic light field towards the first eye and the second eye of the given user, respectively, whilst optically combining the first part and the second part of the synthetic light field with the real-world light field;
   repeat the steps of determining, generating and displaying for a given time period;

during the given time period, detect, by utilising the tracking means, when the given user has made a head movement, whilst fixating on a portion of the virtual content; and when it is detected that the given user has made a head movement, whilst fixating on a portion of the virtual content,
  correct a current relative location of the first eye and of the second eye with respect to the optical combiner, based on a direction and a magnitude of the head movement;
  generate a current light field image, based on the corrected current relative location of the first eye and of the second eye; and
  display the current light field image via the light field display unit to produce a current synthetic light field presenting the virtual content.

2. The system of claim 1, wherein the at least one processor is configured to:
  after it is detected that the given user has made the head movement, whilst fixating on the portion of the virtual content,
    detect whether the given user has made another head movement, whilst fixating on said portion or a neighbouring portion of the virtual content; and
    when it is detected that the given user has not made another head movement, whilst fixating on said portion or a neighbouring portion of the virtual content,
      correct subsequent relative locations of the first eye and of the second eye with respect to the optical combiner, based on the direction and the magnitude of the head movement, and optionally, re-calibrate the tracking means based on the direction and the magnitude of the head movement;
      generate subsequent light field images, based on respective ones of the corrected subsequent relative locations of the first eye and of the second eye; and
      display the subsequent light field images via the light field display unit to produce subsequent synthetic light fields presenting the virtual content.

3. The system of claim 2, wherein the at least one processor is configured to:
  while the subsequent light field images are being displayed, and if the virtual content pertains to a text to be read,
    detect whether eyes of the given user are in a smooth pursuit, by utilising the tracking means; and
    when it is detected that the eyes of the given user are in a smooth pursuit, re-calibrate the tracking means based on the direction and the magnitude of the head movement.

4. The system of claim 2, wherein the at least one processor is configured to:
  when it is detected that the given user has made another head movement, whilst fixating on said portion or the neighbouring portion of the virtual content,
    if a direction of the another head movement is opposite to said direction of the head movement, stop correcting subsequent relative locations of the first eye and of the second eye with respect to the optical combiner, based on the direction and the magnitude of the head movement.

5. The system of claim 2, wherein the at least one processor is configured to:
  store, at least temporarily, historical correction information pertaining to: (i) head movements made whilst fixating on respective portions of the virtual content, (ii) corrections performed based on said head movements, and (iii) respective portions of the optical combiner employed to reflect respective parts of the synthetic light field that present the respective portions of the virtual content towards the eyes of the given user;
  detect when a percentage of head movements that correspond to a given portion of the optical combiner in the historical correction information is greater than a first predefined threshold percent; and
  when it is detected that the percentage of the head movements that correspond to the given portion of the optical combiner in the historical correction information is greater than the first predefined threshold percent, re-calibrate the optical combiner based on the head movements that correspond to the given portion of the optical combiner in the historical correction information.

6. The system of claim 1, wherein the at least one processor is configured to:
  determine a focussing distance of eyes of the given user, by utilising the tracking means;
  when it is detected that the given user has made the head movement, whilst fixating on the portion of the virtual content,
    if the direction of the head movement is along a depth axis, correct the focussing distance of the eyes, based on the direction and the magnitude of the head movement,
    wherein the current light field image is generated further based on the corrected focussing distance of the eyes.

7. The system of claim 6, wherein the at least one processor is configured to:
  store, at least temporarily, historical correction information pertaining to: (i) head movements made whilst fixating on respective portions of the virtual content, and (ii) corrections performed based on said head movements;
  detect when a percentage of head movements whose direction is along the depth axis in the historical correction information is greater than a second predefined threshold percent; and
  when it is detected that the percentage of the head movements whose direction is along the depth axis in the historical correction information is greater than the second predefined threshold percent, re-calibrate the tracking means based on the head movements whose direction is along the depth axis in the historical correction information.

8. The system of claim 1, wherein the at least one processor is configured to:
  when it is detected that the given user has made the head movement, whilst fixating on the portion of the virtual content,
    determine whether the head movement is voluntary or involuntary; and
    correct the current relative location of the first eye and of the second eye, based on the direction and the magnitude of the head movement, only when the head movement is voluntary.

9. The system of claim 1, wherein the system is implemented in a vehicle, the system further comprising at least one sensor employed to sense at least one of: an acceleration, an orientation of the vehicle, wherein the at least one processor is configured to:
  determine a vehicular acceleration signal for a first time period, based on the at least one of: the acceleration, the orientation of the vehicle sensed during the first time period, wherein the vehicular acceleration signal is indicative of a change in at least one of: the acceleration, the orientation of the vehicle;
  apply at least one transformation to the vehicular acceleration signal to generate a head acceleration signal for a second time period, wherein the head acceleration signal is indicative of a change in at least one of: an acceleration, an orientation of a head of the given user;
  determine an expected head movement of the given user, based on the head acceleration signal;
  detect an actual realised head movement of the given user during the second time period, by utilising the tracking means; and
  determine the direction and the magnitude of the head movement, by subtracting the expected head movement from the actual realised head movement.

10. A method comprising:
  utilising tracking means to determine a relative location of a first eye and of a second eye of a given user with respect to an optical combiner, wherein the optical combiner is arranged on an optical path of a light field display unit and on an optical path of a real-world light field of a real-world environment;
  generating a light field image, based on the relative location of the first eye and of the second eye of the given user with respect to the optical combiner;
  displaying the light field image via the light field display unit for producing a synthetic light field presenting virtual content, wherein the optical combiner is employed for reflecting a first part and a second part of the synthetic light field towards the first eye and the second eye of the given user, respectively, whilst optically combining the first part and the second part of the synthetic light field with the real-world light field;
  repeating the steps of determining, generating and displaying for a given time period;
  during the given time period, detecting, by utilising the tracking means, when the given user has made a head movement, whilst fixating on a portion of the virtual content; and
  when it is detected that the given user has made a head movement, whilst fixating on a portion of the virtual content,
    correcting a current relative location of the first eye and of the second eye with respect to the optical combiner, based on a direction and a magnitude of the head movement;
    generating a current light field image, based on the corrected current relative location of the first eye and of the second eye; and
    displaying the current light field image via the light field display unit for producing a current synthetic light field presenting the virtual content.

11. The method of claim 10, further comprising:
  after it is detected that the given user has made the head movement, whilst fixating on the portion of the virtual content,
    detecting whether the given user has made another head movement, whilst fixating on said portion or a neighbouring portion of the virtual content; and
    when it is detected that the given user has not made another head movement, whilst fixating on said portion or a neighbouring portion of the virtual content,
      correcting subsequent relative locations of the first eye and of the second eye with respect to the optical combiner, based on the direction and the magnitude of the head movement, and optionally, re-calibrating the tracking means based on the direction and the magnitude of the head movement;
      generating subsequent light field images, based on respective ones of the corrected subsequent relative locations of the first eye and of the second eye; and
      displaying the subsequent light field images via the light field display unit for producing subsequent synthetic light fields presenting the virtual content.

12. The method of claim 11, further comprising:
  while the subsequent light field images are being displayed, and if the virtual content pertains to a text to be read,
    detecting whether eyes of the given user are in a smooth pursuit, by utilising the tracking means; and
    when it is detected that the eyes of the given user are in a smooth pursuit, re-calibrating the tracking means based on the direction and the magnitude of the head movement.

13. The method of claim 11, further comprising:
  when it is detected that the given user has made another head movement, whilst fixating on said portion or the neighbouring portion of the virtual content,
    if a direction of the another head movement is opposite to said direction of the head movement, stopping correcting subsequent relative locations of the first eye and of the second eye with respect to the optical combiner, based on the direction and the magnitude of the head movement.

14. The method of claim 11, further comprising:
  storing, at least temporarily, historical correction information pertaining to: (i) head movements made whilst fixating on respective portions of the virtual content, (ii) corrections performed based on said head movements, and (iii) respective portions of the optical combiner employed to reflect respective parts of the synthetic light field that present the respective portions of the virtual content towards the eyes of the given user;
  detecting when a percentage of head movements that correspond to a given portion of the optical combiner in the historical correction information is greater than a first predefined threshold percent; and
  when it is detected that the percentage of the head movements that correspond to the given portion of the optical combiner in the historical correction information is greater than the first predefined threshold percent, re-calibrating the optical combiner based on the head movements that correspond to the given portion of the optical combiner in the historical correction information.

15. The method of claim 10, further comprising:
  determining a focussing distance of eyes of the given user, by utilising the tracking means;
  when it is detected that the given user has made the head movement, whilst fixating on the portion of the virtual content, if the direction of the head movement is along a depth axis, correcting the focussing distance of the eyes, based on the direction and the magnitude of the head movement, wherein the current light field image is generated further based on the corrected focussing distance of the eyes.

16. The method of claim 15, further comprising:

storing, at least temporarily, historical correction information pertaining to: (i) head movements made whilst fixating on respective portions of the virtual content, and (ii) corrections performed based on said head movements;

detecting when a percentage of head movements whose direction is along the depth axis in the historical correction information is greater than a second predefined threshold percent; and when it is detected that the percentage of the head movements whose direction is along the depth axis in the historical correction information is greater than the second predefined threshold percent, re-calibrating the tracking means based on the head movements whose direction is along the depth axis in the historical correction information.

17. The method of claim 10, further comprising:

when it is detected that the given user has made the head movement, whilst fixating on the portion of the virtual content, determining whether the head movement is voluntary or involuntary; and correcting the current relative location of the first eye and of the second eye, based on the direction and the magnitude of the head movement, only when the head movement is voluntary.

18. The method of claim 10, further comprising:

determining a vehicular acceleration signal for a first time period, based on at least one of: an acceleration, an orientation of a vehicle sensed by at least one sensor during the first time period, wherein the vehicular acceleration signal is indicative of a change in at least one of: the acceleration, the orientation of the vehicle;

applying at least one transformation to the vehicular acceleration signal for generating a head acceleration signal for a second time period, wherein the head acceleration signal is indicative of a change in at least one of: an acceleration, an orientation of a head of the given user;

determining an expected head movement of the given user, based on the head acceleration signal;

detecting an actual realised head movement of the given user during the second time period, by utilising the tracking means; and determining the direction and the magnitude of the head movement, by subtracting the expected head movement from the actual realised head movement.

* * * * *